United States Patent
Liu et al.

(10) Patent No.: US 8,793,403 B2
(45) Date of Patent: Jul. 29, 2014

(54) SERVER SYSTEM AND MANAGEMENT METHOD THEREOF FOR TRANSFERRING REMOTE PACKET TO HOST

(75) Inventors: Pang-Yu Liu, New Taipei (TW); Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 143 days.

(21) Appl. No.: 13/459,269

(22) Filed: Apr. 30, 2012

(65) Prior Publication Data

US 2013/0254361 A1 Sep. 26, 2013

(30) Foreign Application Priority Data

Mar. 22, 2012 (TW) .............................. 101109875 A

(51) Int. Cl.
  *G06F 15/16* (2006.01)
  *G06F 3/06* (2006.01)
  *G06F 17/30* (2006.01)

(52) U.S. Cl.
  CPC ............ *G06F 3/0679* (2013.01); *G06F 3/0646* (2013.01); *G06F 17/30011* (2013.01)
  USPC ............................... 709/250; 709/225; 718/1

(58) Field of Classification Search
  CPC ... G06F 3/0679; G06F 3/0646; G06F 3/0647; G06F 3/065; G06F 17/30011
  USPC ................. 709/220, 221, 222, 223, 225, 250; 718/1
  See application file for complete search history.

(56) References Cited

U.S. PATENT DOCUMENTS

| | | | |
|---|---|---|---|
| 7,872,965 B2 * | 1/2011 | Enstone et al. | 370/217 |
| 8,296,437 B2 * | 10/2012 | Pankratov | 709/227 |
| 8,442,048 B2 * | 5/2013 | Aybay et al. | 370/392 |
| 2007/0055793 A1 | 3/2007 | Huang et al. | |
| 2007/0086449 A1 | 4/2007 | Huang et al. | |
| 2012/0278802 A1 * | 11/2012 | Nilakantan et al. | 718/1 |
| 2013/0238785 A1 * | 9/2013 | Hawk et al. | 709/224 |

FOREIGN PATENT DOCUMENTS

TW I330027 9/2010

OTHER PUBLICATIONS

"Office Action of Taiwan Counterpart Application", issued on Apr. 25, 2014, p. 1-p. 9.

* cited by examiner

*Primary Examiner* — Viet Vu
(74) *Attorney, Agent, or Firm* — Jianq Chyun IP Office

(57) ABSTRACT

A server system and a management method thereof are provided. A main server is used to manage a plurality of hosts in the server system. The main server detects a device controller of each of the hosts for obtaining location information of each device controller. One Internet Protocol (IP) address is configured to each location information. A virtual network interface card (NIC) is established according to the IP address, and a remote package is received through the virtual NIC for transmitting package to the device controller corresponding to the virtual NIC.

15 Claims, 3 Drawing Sheets

SERVER SYSTEM AND MANAGEMENT METHOD THEREOF FOR TRANSFERRING REMOTE PACKET TO HOST

CROSS-REFERENCE TO RELATED APPLICATION

This application claims the priority benefit of Taiwan application serial no. 101109875, filed on Mar. 22, 2012. The entirety of the above-mentioned patent application is hereby incorporated by reference herein and made a part of this specification.

BACKGROUND OF THE INVENTION

1. Field of the Invention

The present invention relates to a server system management mechanism, and particularly relates to a server system and a management method thereof.

2. Description of Related Art

Presently, a server system is broadly used by each enterprise, and the scope of the development not only cooperates the application of the internet and the telecommunication industry, but also goes to the normal livings of people deeply, for example, banking, finance, network banks, and network credit cards, etc. All of these need powerful computation abilities of a server.

Generally speaking, a remote device can communicate with each host of a server system through Serial Over LAN (SOL; LAN=Local Area Network). That is to say, each host has its individual SOL, and booting, shutting off or any configuration of a host can be executed through SOL remotely. Accordingly, the management on a traditional server system is quite difficult and easy to cause a leakage of security.

SUMMARY OF THE INVENTION

The present invention provides a server system management method, wherein the transmitting of packets is managed by a main server centrally to improve the security.

The present invention provides a server system management method for managing a plurality of hosts of the server system by a main server. Herein, each of the hosts has a corresponding device controller. The main server detects the device controller of each of the hosts to obtain location information of the device controller in the server system. An internet protocol (IP) address is configured to each of the location information. And, a virtual network interface (NIC) card is established according to the IP address, and a remote packet is received from a remote device through the virtual network interface card for transmitting the remote packet to the device controller to which the virtual network interface card corresponds.

In one embodiment of the present invention, in the device controller detecting each host, a number of the device controllers and location information of the device controller is detected via an Inter-Process Communication (IPC) technique.

In one embodiment of the present invention, in the step of configuring the IP address to the location information, an address configuration file is loaded from a file system and the IP address is configured to each location information according to the address configuration file in a dynamic or static way.

In one embodiment of the present invention, the management method further includes establishing a gateway daemon thread, and establishing the virtual network interface card according to the IP address by the gateway daemon thread.

In one embodiment of the present invention, after receiving the remote packet from the remote device through the virtual network interface card for transmitting the remote packet to the device controller to which the virtual network interface card corresponds, the remote packet is transformed from a first message format into a second message format which a connection interface coupled between the device controller and one of the corresponding hosts is supported by the device controller. For example, the first message format is a Remote Management and Control Protocol (RMCP) message format, the second message format is an node to node message format of Intelligent Platform Management Bus/Bridge (IPMB).

In one embodiment of the present invention, after receiving the remote packet from the remote device through the virtual network interface card, a format of the remote packet is checked if it matches the first message format. If the format of the remote packet matches the first message format, the remote packet is transmitted to the device controller. In contrast, if the remote packet does not match the first message format, another remote packet is waited to receive.

In one embodiment of the present invention, in the step of transforming the remote packet from the first message format into the second message format which the connection interface is supported, header data and session data of the first message format are stored in the device controller, and payload data of the first message format is obtained and transformed into being matched with the second message format.

In one embodiment of the present invention, after receiving the remote packet from the remote device through the virtual network interface card for transmitting the remote packet to the device controller to which the virtual network interface card corresponds, a responding packet is received from the device controller and is transmitted to the remote device. Herein, the responding packet is received from one of the hosts to which the device controller corresponds by the device controller. The responding packet is transformed from the second message format into the first message format according the stored header data and the session data by the device controller.

The present invention also provides a server system which includes a plurality of hosts and a main server. Each of the hosts is respectively coupled to at least one device controller. The main server is coupled to the device controller of each of the hosts for managing the hosts. Herein, the main server would execute a management procedure. The management procedure includes detecting the device controller of each of the hosts to obtain location information of the device controller in the server system, configuring an interne protocol (IP) address to the location information, establishing a virtual network interface card according to the IP address, and receiving a remote packet from a remote device through virtual network interface card for transmitting the remote packet to the device controller to which the virtual network interface card corresponds.

In one embodiment of the present invention, the main server comprises a storage unit and a processing unit. An address configuration file and a gateway software are stored in the storage unit. The processing unit is coupled to the storage unit, and executes the management procedure via the gateway software.

In one embodiment of the present invention, the gateway software comprises an Inter-Process Communication (IPC) dock, an information storage center, and a daemon factory. The Inter-Process Communication dock is configured to detect an number of the device controllers and the location information of the device controllers. The information storage center is configured to store the number of the device controllers and the location information of the device controllers. The daemon factory is configured to create a gateway daemon thread. Herein, the daemon thread is configured to load the address configuring file from a file system, and establish the virtual network interface card according to the IP address to which the location information obtained through the address configuration file corresponds to.

In one embodiment of the present invention, after the main server receives the remote packet from the remote device through the virtual network interface card, and transmits the remote packet to the device controller to which the virtual network interface card corresponds, the device controller transforms the remote packet from a first message format into a second message format which a connection interface supports. Herein, the connection interface is coupled between the device controller and one of the hosts to which the device controller corresponds.

In one embodiment of the present invention, after receiving the remote packet, the device controller would store header data and session data of the first message format in itself, obtain payload data of the first message format, and transform the payload data into being matched with the second message format.

In one embodiment of the present invention, after receiving a responding packet from the hosts to which the device controllers corresponds, the device controller would transform the responding packet from the second message format into the first message format according to the stored header data and the session data for transmitting the responding packet to the remote device via the gateway daemon thread.

Based on what is discussed, the external connection of each host in the server system is turned off and each host is connected to what's external through the main server such that the whole environment becomes close and the security is improved.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
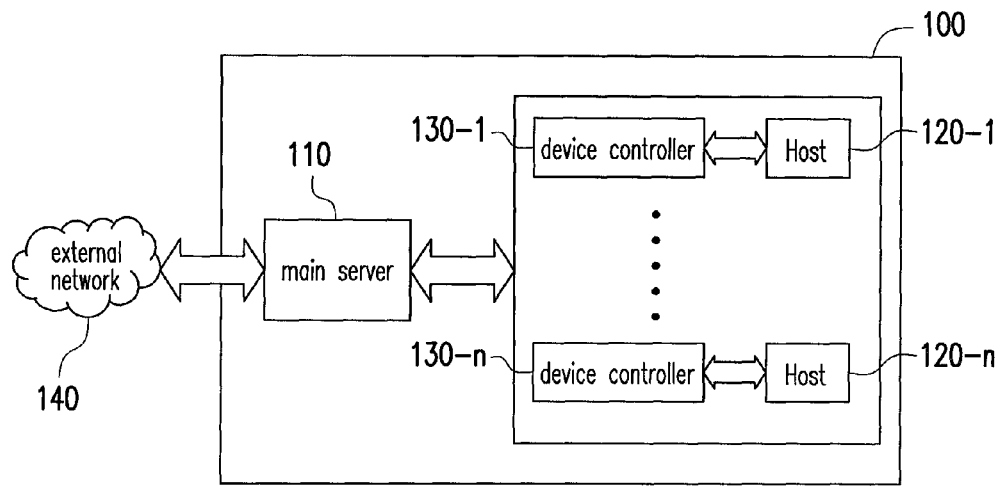
FIG. 1 is a block diagram of a server system in accordance with an embodiment of the invention.

FIG. 1 is a block diagram of a server system in accordance with an embodiment of the invention. Referring to FIG. 1, server system 100 includes main server 110 and a plurality of hosts 120-1~120-$n$. Herein, "n" is the number of the hosts. In the present embodiment, hosts 120-1~120-$n$ are respectively coupled to the device controllers 130-1~130-$n$. Namely, a host is coupled to a device controller. In other embodiments, each host could be coupled to two or more than two device controllers.

Main server 110 is coupled to the device controllers 130-1~130-$n$ of all the hosts 120-1~120-$n$. Main server 110 communicates with the hosts 120-1~120-$n$ through a internal network, and communicates with a remote device through the external network 140.

Figure 2:
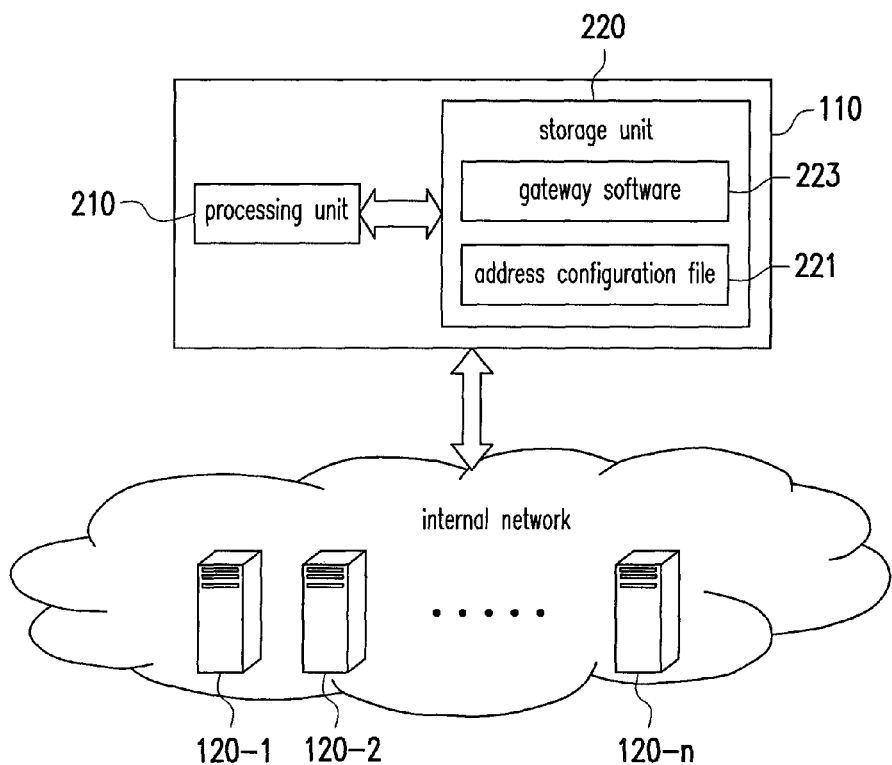
FIG. 2 is a block diagram of a server system in accordance with another embodiment of the invention.

Another embodiment will be illustrated as follows to further describe the internal structure of the main server 110 in detail. FIG. 2 is a block diagram of a server system in accordance with another embodiment of the invention. In the present embodiment, the server system 100 manages the hosts 120-1~120-$n$ by means of main server 110 executing a management procedure.

Referring to FIG. 2, the main server 110 includes a processing unit 210 and a storage unit 220, and the processing unit 210 is coupled to the storage unit 220. An address configuration file 221 and a gateway software 223 is stored in the storage unit 220. The main server 110 manages the hosts 120-1~120-$n$ by using the processing unit 210 executing the gateway software 223.

For example, the gateway software 223 is stored in the storage unit 220, wherein the gateway software includes a plurality of code segments (e.g. code segments for building up structural figures, code segments for checking tables, code segments for settings and code segments for configuration). After loading and executing these code segments, the processing unit 210 could execute a management procedure to manage the hosts 120-1~120-$n$.

The said management procedure include detecting device controller 130-1~130-$n$ to obtain location information of the device controller 130-1~130-$n$ in the server system 100. As for the server system 100 being a rack server, for example, the location information is a rack number, a chassis number and a sled number, which is the physical location of the hosts 120-1~120-$n$ in the server system 100. For example, the rack server includes at least one rack, each rack includes at least one chassis, each chassis includes at least one sled, and it is assumed that one host can be disposed on each sled. After that, an Internet Protocol (IP) address is configured to each location information, that is, external IP addresses of the device controller 130-1~130-$n$ are configured. Therefore, a virtual network interface card to which each of the device controllers 130-1~130-$n$ corresponds could be established respectively according to the IP addresses. A remote packet is received from a remote device through the virtual network interface card and the remote packet is transmitted to the device controller 130-1~130-$n$ to which the virtual network interface cards correspond. Accordingly, a remote device connected to the device controller 130-1~130-$n$ is effectively managed.

Figure 3:
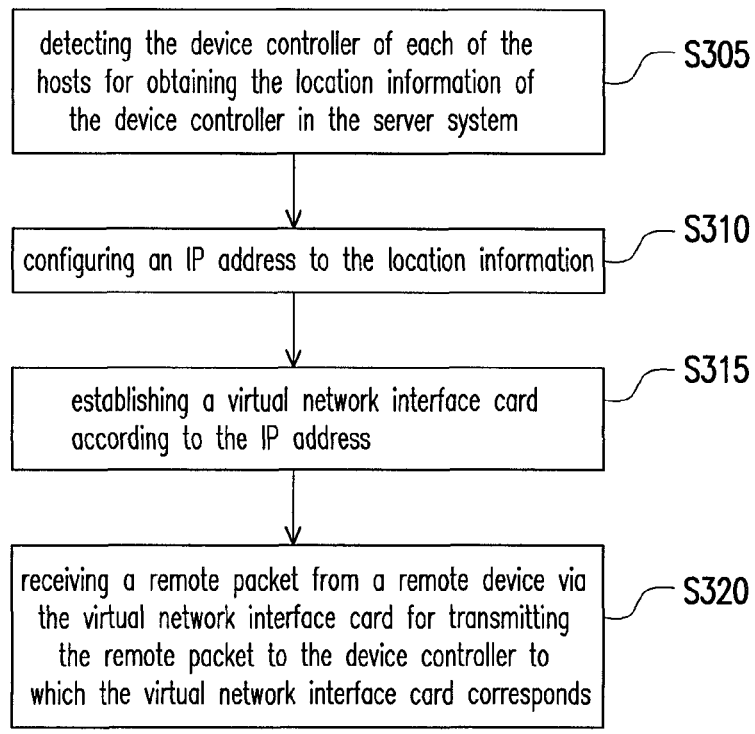
FIG. 3 is a flow chart of a server system management method according to an embodiment of the present invention.

Another example is illustrated as follows to describe steps in a server system management method in detail. FIG. 3 is a flow chart of a server system management method according to an embodiment of the present invention. Referring to FIG. 1 to FIG. 3, in the present embodiment, the processing unit 210 manages the hosts 120-1~120-$n$ via the gateway software 223.

In step S305, the processing unit 210 detects the device controller 130-1~130-$n$ of each of the hosts 120-1~120-$n$ through the internal network to obtain location information of the device controller 130-1~130-$n$ in the server system 100. For example, the processing unit 210 could detect the number of device controllers 130-1~130-$n$ and the location information of the device controllers 130-1~130-$n$ via a Inter-Process Communication (IPC) technique. Herein, for example, the location information is the route of the device controllers 130-1~130-*n* in the server system 100. Taking the rack server system as an example, the route could be represented as "/rack number/chassis number/sled number".

Then, in step S310, an internet protocol (IP) address is configured to the location information. For example, gateway software 223 would load the address configuration file 221 from a file system. Herein, a static configuration or a dynamic configuration is determined to configure the IP address to which the location information corresponds according to a static mapping or a dynamic mapping set in the address configuration file 221.

One of the methods of the static configuration is assigning fixed-format IP addresses to the device controllers correspond to the internal part of the server system. For example, in the static configuration, an IP address is configured with a fixed-format "192.r.c.s", where r is a rack number, c is a chassis number, and s is a sled number. For example, the external IP address configured to device controller of the host which is located in the third sled of the second chassis of the first rack (i.e. rack number 1, chassis number 2, sled number 3) is "192.1.2.3". Another method of the static configuration is setting an address mapping table, and the location information and the corresponding IP address of each of the device controllers is stored in the address mapping table.

The dynamic figuration is divided into a sequential assigning or a random assigning. The sequential assigning is sequentially assigning IP addresses according to the location information. For example, the IP address "192.0.0.1" is configured to the first sled of the first chassis of the first rack (e.g. the location information is represented as "/Rack 1/Chassis 1/Sled 1"), the IP address "192.0.0.2" is configured to the second sled of the first chassis of the first rack (e.g. the location information is represented as "/Rack 1/Chassis 1/Sled 2"), and analogically for the rest. The random assigning could be assigning an IP address to each location information randomly. After assigning, these pairs are recorded.

After that, in step S315, the gateway software 223 would establish virtual network interface cards according to the IP addresses.

For example, the gateway software 223 could create gateway daemon threads so that the gateway daemon threads would establish the virtual network interface cards according to the IP addresses.

Figure 4:
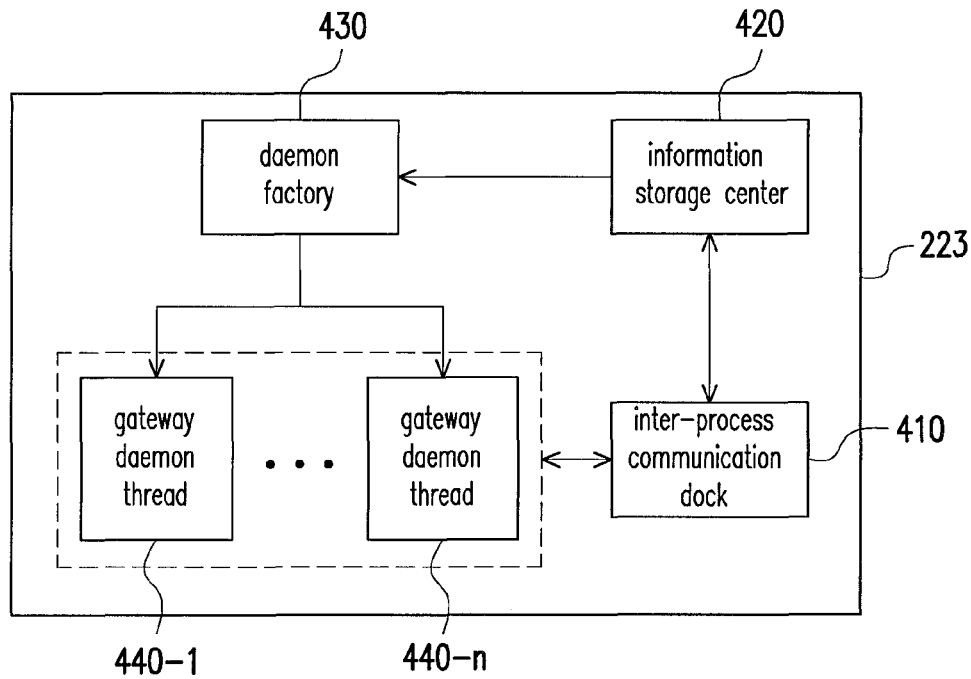
FIG. 4 is a schematic view of the structure of a gateway software according to an embodiment of the present invention.

Another example is further illustrated to describe the structure of the gateway software. FIG. 4 is a schematic view of the structure of a gateway software according to an embodiment of the present invention. Referring to FIG. 1, FIG. 2 and FIG. 4, the gateway software 223 includes an Inter-Processing Communication (IPC) dock 410, an information storage center 420 and a daemon factory 430.

The Inter-Processing Communication dock 410 is configured to detect the number "n" of the device controllers 130-1~130-*n* and the location information of the device controllers 130-1~130-*n*. The information storage center 223 is configured to store the number "n" and the location information detected by the Inter-Process Communication dock 410. The daemon factory 430 would create gateway daemon threads 440-1~440-*n* according to the number "n" and the location information stored in the information storage center 223. For example, it is assumed that the number "n" detected by the Inter-Processing Communication dock 410 is "5", then the daemon factory 430 would create five gateway daemon threads 440-1~440-5.

The gateway daemon threads 440-1~440-*n* are respectively responsible for the device controller 130-1~130-*n*. Namely, a gateway daemon thread is responsible for a device controller. The gateway daemon threads 440-1~440-*n* are configured to load address configuration file 221 from the file system, and to establish the virtual network interface card of each of the device controllers 130-1~130-*n* according to IP addresses obtained from the address configuration file 221

Referring back to FIG. 3, after establishing the virtual network interface card of each of the device controllers 130-1~130-*n*, in step S320, the main server 110 could receive a remote packet from a remote device through the virtual network interface cards for transmitting the remote packet to the device controllers to which a virtual network interface card corresponds. It is assumed that the remote packet is received by the device controller 130-1, and the device controller 130-1 would further transform the remote packet from a first message format into a second message format which a connection interface coupled between the device controller 130-1 and the corresponding host 120-1 is supported, and transmit the packet in the second message format to the host 120-1. When the device controller 130-1 receives a responding packet from the corresponding host 120-1, the device controller 130-1 would transform the responding packet from the second message format into the first message format, and transmit the responding packet with the first message format to the main server 110. Herein, for example, the first message format is a Remote Management and Control Protocol (RMCP) message format, and, for example, the second message format is an IPMB message format.

For simplicity, take device controller 130-1 as an example, another embodiment is illustrated to describe the process of transmitting packets. It is analogically for the rest of device controller 130-*n*, a detailed description will not be repeated.

Figure 5:
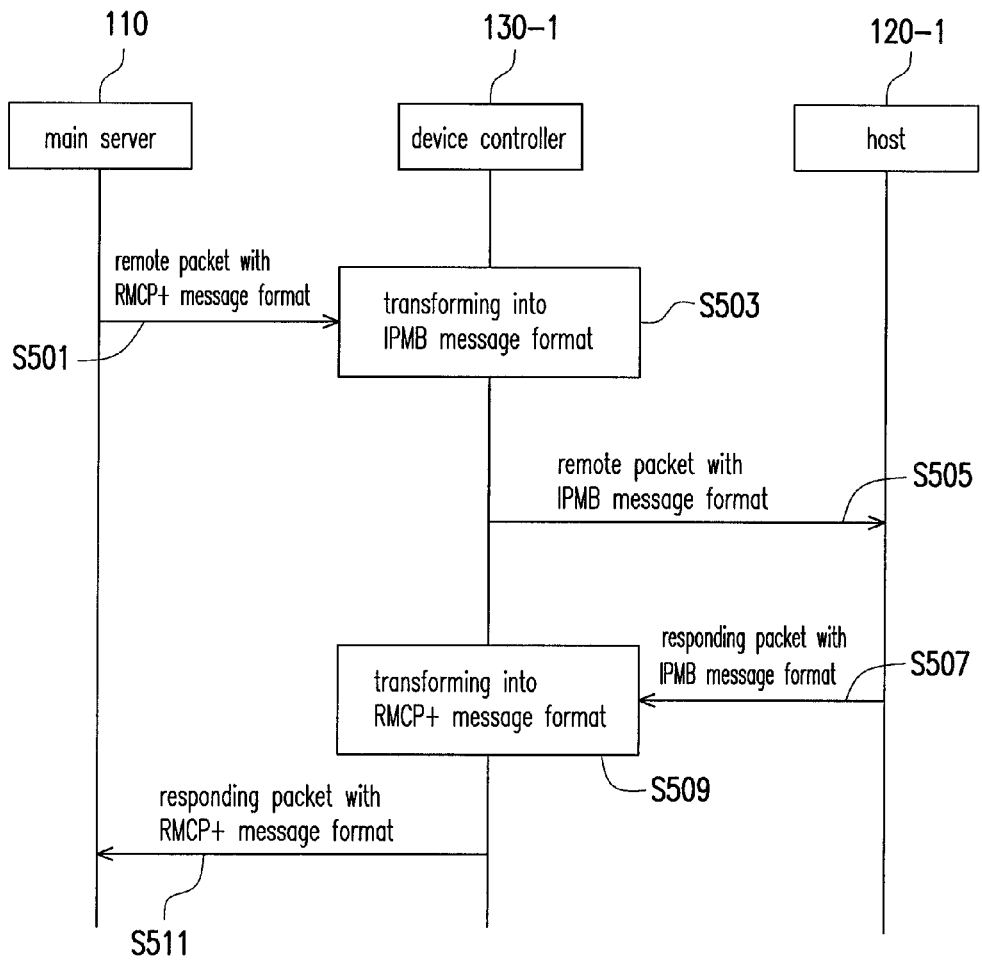
FIG. 5 is a schematic view of the flow of transmitting packets in a server system according to an embodiment of the present invention.

FIG. 5 is a schematic view of the flow of transmitting packets in a server system according to an embodiment of the present invention. In the present embodiment, take the example that the remote packet is received by the virtual network interface card to which the device controller 130-1 in the main server 110 corresponds. It is assumed that main server 110 supports Serial over LAN (SOL) of the standards of Intelligent Platform Management Interface (IPMI). Wherein, SOL could redirect the output of the main server 110 to the remote device such that it can be managed by a user at a remote terminal. And the message with the standard of IPMI would be packed into a packet with the message format of Remote Management and Control Protocol (RMCP). In the present embodiment, take a message with the standard of IPMI 2.0 as an example, the message with the standard of IPMI 2.0 would be packed into a packet with the RMCP+ message format.

And, it is assumed that the connection interface coupled between the device controller 130-1 and host 120-1 belongs to Inter-Integrated Circuit ($I^2C$) interface of the standard of Intelligent Platform Management Bus/Bridge (IPMB). For example, the host 120-1 includes a Baseboard Management Controller (BMC), and the BMC is coupled to the device controller 130-1 through $I^2C$ interface. Wherein, the message format supported by $I^2C$ interface is node to node message format of IPMB.

Referring to FIG. 1 and FIG. 5, after receiving a remote packet from a remote device, the main server 110 could check if the remote packet matches the RMCP+ message format (i.e. first message format). Herein, the packet with the RMCP+ message format includes header data of RMCP, session data of IPMI, and payload data of IPMI.

If the format of the remote packet matches the RMCP+ message format, the remote packet is transmitted to the device controller 130-1. In contrast, if the remote packet does not match the RMCP+ message format, another remote packet is waited to receive.

After receiving the remote packet with the RMCP+ message format, in step S501, main server 110 would transmit the remote packet with the RMCP+ message format to the device controller 130-1. For example, the main server 110 could transmit the remote packet with the RMCP+ message format to the device controller 130-1 via User Datagram Protocol (UDP) or Transmission Control Protocol (TCP).

After the device controller 130-1 receives the remote packet, as illustrated by step S503, device controller 130-1 would transform the remote packet from RMCP+ message format into IPMB message format (i.e. second message format) supported by the connection interface coupled between the device controller 130-1 and the corresponding host 120-1. For example, device controller 130-1 would store the header data and session data of the RMCP+ message format in the device controller 130-1, obtain the payload data of the RMCP+ message format, and transform the payload data into being matched with the node to node message format of IPMB message format. Herein, all of the contents of the payload data in the RCMP+ message format could be IPMB message format. However, in other embodiments, the payload data in the RMCP+ message format could also be contents with other formats, and be reorganized to the IPMB message format by device controller 130-1.

Then, in step S505, the device controller 130-1 transmits the remote packet with IPMB message format to the host 120-1. For example, the device controller 130-1 transmits the remote packet with IPMB message format to the BMC of host 120-1 via I$^2$C interface.

Then, in step S507, the host 120-1 transmits the responding packet with IPMB message format to the device controller 130-1. In step S509, the device controller 130-1 transforms the responding packet from IPMB message format into the RMCP+ message format according to the header data and session data previously stored. Herein, if the main server 110 supports multi session, then the session data will include session numbers. Consequently, where the responding packet is to be transmitted could be obtained according to the session data previously stored.

And then, in step S511, the main server 110 receives the responding packet with RMCP+ message format from the device controller 130-1 and transmits the responding packet to the remote device.

In addition, a log can be further recorded via the central management of main server 110 for checking the session of the remote device. For example, if a problem in a configuration of any host is occurred, where the problem is can be obtained by looking up the log. Besides, the main server 110 can be further set that if some particular functions are enable or disable, a warning will be sent out to inform the manager. For example, when a remote device is trying to alter the configuration of Universal Serial Bus (USB) in one of the hosts via the main server 110, the main server 110 can sent out a warning instantly to inform the manager. Or when the frequency of Basic Input Output System (BIOS) is altered over a predetermined value, a warning is also sent out to inform the manager.

As discussed above, in the above embodiment, a corresponding virtual network interface card for an interval host is established via the main server to unify the external communication, such that a remote device cannot operate each host directly. Accordingly, a remote device can be connected to one of the hosts through the virtual network interface card, but cannot obtain to which internal host is connected through the virtual network interface card. The remote device needs to have the priority of logging in the main server to obtain which host is accessed, therefore the security is improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A server system management method for managing a plurality of hosts in the server system by a main server, wherein each of the hosts correspondingly comprises a device controller, the method comprises:
    detecting the device controller of each of the hosts to obtain location information of the device controller in the server system;
    configuring an internet protocol address to the location information;
    establishing a virtual network interface card according to the internet protocol address;
    receiving a remote packet from a remote device through the virtual network interface card;
    checking if a format of the remote packet matches a first message format;
    if the format of the remote packet matches the first message format, transmitting the remote packet to the device controller to which the virtual network interface card corresponds, and transforming the remote packet from the first message format into a second message format; and
    if the remote packet does not match the first message format, waiting for receiving another remote packet.

2. The server system management method as claimed in claim 1, wherein the step of detecting the device controller of each of the hosts comprises:
    detecting an number of the device controller and the location information of the device controller via an inter-process communication technique.

3. The server system management method as claimed in claim 1, wherein the step of configuring the interne protocol address to the location information comprises:
    loading an address configuration file from a file system; and
    configuring the internet protocol address to the location information according to the address configuration file in a dynamic or static way.

4. The server system management method as claimed in claim 1, further comprises:
    creating a gateway daemon thread to establish the virtual network interface card according to the interne protocol address by the gateway daemon thread.

5. The server system management method as claimed in claim 1, wherein
    the second message format is supported by a connection interface coupled between the device controller and one of the hosts to which the device controller corresponds.

6. The server system management method as claimed in claim 5, wherein the first message format is a remote management and control protocol (RMCP) message format, the second message format is an node to node message format of an intelligent platform management bus/bridge (IPMB).

7. The server system management method as claimed in claim 5, wherein the step of transforming the remote packet from the first message format into the second message format comprises:

storing header data and session data of the first message format in the device controller;
obtaining payload data of the first message format; and
transforming the payload data into being matched with the second message format.

8. The server system management method as claimed in claim 7, wherein after the step of transmitting the remote packet to the device controller to which the virtual network interface card corresponds, the method further comprises:
receiving a responding packet from the device controller for transmitting the responding packet to the remote device.

9. The server system management method as claimed in claim 8, wherein the step of receiving the responding packet from the device controller for transmitting the responding packet to the remote device comprises:
receiving the responding packet from one of the hosts to which the device controller corresponds by the device controller; and
transforming the responding packet from the second message format into the first message format according the stored header data and the session data by the device controller.

10. A server system, comprising:
a plurality of hosts, respectively coupled to a device controller; and
a main server, coupled to the device controller of each of the hosts for managing the hosts, wherein the main server executes a management procedure, the management procedure includes: detecting the device controller of each of the hosts to obtain location information of the device controller in the server system, configuring an internet protocol address to the location information, establishing a virtual network interface card according to the internet protocol address to receive a remote packet from a remote device through the virtual network interface card, checking if a format of the remote packet matches a first message format, transmitting the remote packet to the device controller to which the virtual network interface card corresponds if the format of the remote packet matches the first message format, and waiting for receiving another remote packet if the remote packet does not match the first message format, wherein the device controller to which the virtual network interface card corresponds transforms the remote packet from the first message format into a second message format.

11. The server system as claimed in claim 10, wherein the main server comprises:
a storage unit, storing an address configuration file and a gateway software; and
a processing unit, coupled to the storage unit, executing the management procedure via the gateway software.

12. The server system as claimed in claim 11, wherein the gateway software comprises:
an inter-process communication dock, detecting an number of the device controller and the location information of the device controller;
an information storage center, storing the number of the device controller and the location information of the device controller; and
a daemon factory, creating a gateway daemon thread;
wherein, the gateway daemon thread loads the address configuration file from a file system, and establishes the virtual network interface card according to the internet protocol address to which the location information obtained via the address configuration file corresponds to.

13. The server system as claimed in claim 10, wherein the second message format is supported by a connection interface coupled between the device controller and one of the hosts to which the device controller corresponds.

14. The server system as claimed in claim 13, wherein the device controlled stores header data and session data of the first message format in itself, obtains payload data of the first message format, and transforms the payload data into being matched with the second message format.

15. The server system as claimed in claim 14, wherein after receiving a responding packet from one of the hosts to which the device controllers corresponds, the device controller transforms the responding packet from the second message format into the first message format according to the stored header data and the session data and transmits the responding packet to the remote packet by the gateway daemon thread.

* * * * *